(12) United States Patent
Yomtobian

(10) Patent No.: US 7,610,276 B2
(45) Date of Patent: Oct. 27, 2009

(54) INTERNET SITE ACCESS MONITORING

(75) Inventor: Daniel Yomtobian, Encino, CA (US)

(73) Assignee: Advertise.com, Inc., Sherman Oaks, CA (US)

( * ) Notice: Subject to any disclaimer, the term of this patent is extended or adjusted under 35 U.S.C. 154(b) by 259 days.

(21) Appl. No.: 11/534,593

(22) Filed: Sep. 22, 2006

(65) Prior Publication Data

US 2008/0077561 A1 Mar. 27, 2008

(51) Int. Cl.
*G06F 17/30* (2006.01)
(52) U.S. Cl. ............... 707/3; 707/5; 707/10; 707/104.1
(58) Field of Classification Search ............. 707/1–7, 707/10, 104.1; 705/14; 709/223–224
See application file for complete search history.

(56) References Cited

U.S. PATENT DOCUMENTS

| 6,061,660 | A * | 5/2000 | Eggleston et al. ............. 705/14 |
| 6,112,240 | A * | 8/2000 | Pogue et al. ................. 709/224 |
| 6,505,201 | B1 * | 1/2003 | Haitsuka et al. ............... 707/10 |
| 6,826,594 | B1 * | 11/2004 | Pettersen .................... 709/203 |
| 6,944,660 | B2 * | 9/2005 | Eshghi et al. ............... 709/224 |
| 6,963,874 | B2 * | 11/2005 | Kasriel et al. ................. 707/10 |
| 7,020,622 | B1 * | 3/2006 | Messer ........................ 705/26 |
| 7,376,722 | B1 * | 5/2008 | Sim et al. .................... 709/223 |
| 7,386,673 | B2 * | 6/2008 | van Riel ..................... 711/133 |
| 7,464,187 | B2 * | 12/2008 | Glommen et al. ........... 709/250 |
| 7,539,740 | B2 * | 5/2009 | Hasunuma .................. 709/223 |
| 2003/0088465 | A1 | 5/2003 | Monteverde |
| 2003/0131106 | A1 * | 7/2003 | Kasriel ........................ 709/225 |
| 2003/0167212 | A1 | 9/2003 | Monteverde |
| 2004/0107363 | A1 | 6/2004 | Monteverde |
| 2004/0153365 | A1 | 8/2004 | Schneider |
| 2004/0172389 | A1 * | 9/2004 | Galai et al. ..................... 707/3 |
| 2005/0102358 | A1 * | 5/2005 | Gold et al. .................. 709/204 |
| 2006/0015763 | A1 * | 1/2006 | Nakajima ...................... 714/4 |
| 2006/0036400 | A1 * | 2/2006 | Kasriel et al. ............... 702/182 |
| 2006/0064411 | A1 * | 3/2006 | Gross et al. .................... 707/3 |

* cited by examiner

*Primary Examiner*—Don Wong
*Assistant Examiner*—Hanh B Thai
(74) *Attorney, Agent, or Firm*—SoCal IP Law Group LLP; Mark A. Goldstein

(57) ABSTRACT

Internet site access monitoring techniques are disclosed. A method may include receiving a search query and preparing a search response. The search response may include a trigger script and one or more advertiser links. The search response is provided to the user. User activation of an advertiser link may be recognized and advertiser link information and a unique identifier may be received. An advertiser web page may be provided to a user along with a hidden frame including a tracking script. A notification from the tracking script may be received whenever the user clicks on a link on the advertiser web page. The methods may be implemented in software and executed on one or more servers and/or other computing devices.

9 Claims, 4 Drawing Sheets

INTERNET SITE ACCESS MONITORING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to networks, the Internet and monitoring visitor access to Internet sites.

2. Related Art

The Internet is ubiquitous in modern culture. People use the Internet to search for products and services, to read news, to purchase music, to share photos, and for many other tasks. Because there are many websites available through the World Wide Web interface to the Internet, search engines have evolved to assist Internet users searching for web pages having desired content specified in a search query. The content may be descriptions of products available for purchase, product reviews, items to research, news stories, music files, people to find, and many others. Search engines index web pages based on words and other information included in the web pages. Web pages may be indexed according to key words and/or concepts. When an Internet user submits a search query, a search response that includes a search results listing of web pages having the same or similar keywords and/or concepts contained in the search query is provided.

To earn income, search engine providers may allow businesses to purchase a listing space in an advertiser link listing that is displayed adjacent to the search results listing in the search response. Along with a search results listing of indexed web pages, a search response may also contain a list of paid links that will direct a user to a website having products or information related or corresponding to the user's search query. This is a very popular form of Internet advertising. These paid links draw Internet users to the advertiser's website where the user may make a purchase. The increased website traffic resulting from paid listings is something businesses are willing to pay for. The search engine provider may earn income from advertisers who pay for inclusion of paid links in search responses. The search engine provider may charge an advertiser whenever a paid link is displayed in a search response. The search engine provider may charge an advertiser whenever an Internet user clicks on a displayed paid link contained in a search response.

Another way a search engine provider may earn income is to allow businesses to purchase improved placement in search results listings. A search engine provider may influence the position of search results contained in the search response based on whether a particular search result corresponds to a website of an advertiser who pays for improved placement. More specifically, if a search response includes a listing of 100 search results, and each search result corresponds to a web page from a different owner, the search engine provider may move the naturally occurring $8^{th}$ result to the top of the search results list in the search response if the owner of the web page entered into a placement agreement with the search engine provider. The search engine provider may charge an advertiser when a web page link included in a search results listing is moved up to a premium position from a less desirable position in a search response.

DETAILED DESCRIPTION

Systems and methods for monitoring Internet site access are described herein. Throughout this description, the embodiments and examples shown should be considered as exemplars, rather than limitations on the systems and methods disclosed or claimed. The systems and methods for monitoring Internet site access described herein may be used to verify and/or qualify user Internet website access to alleviate click fraud, to charge a referral fee based on the quality of a user visit, to certify the veracity of referral billing reports, and for other purposes.

A System

Figure 1:
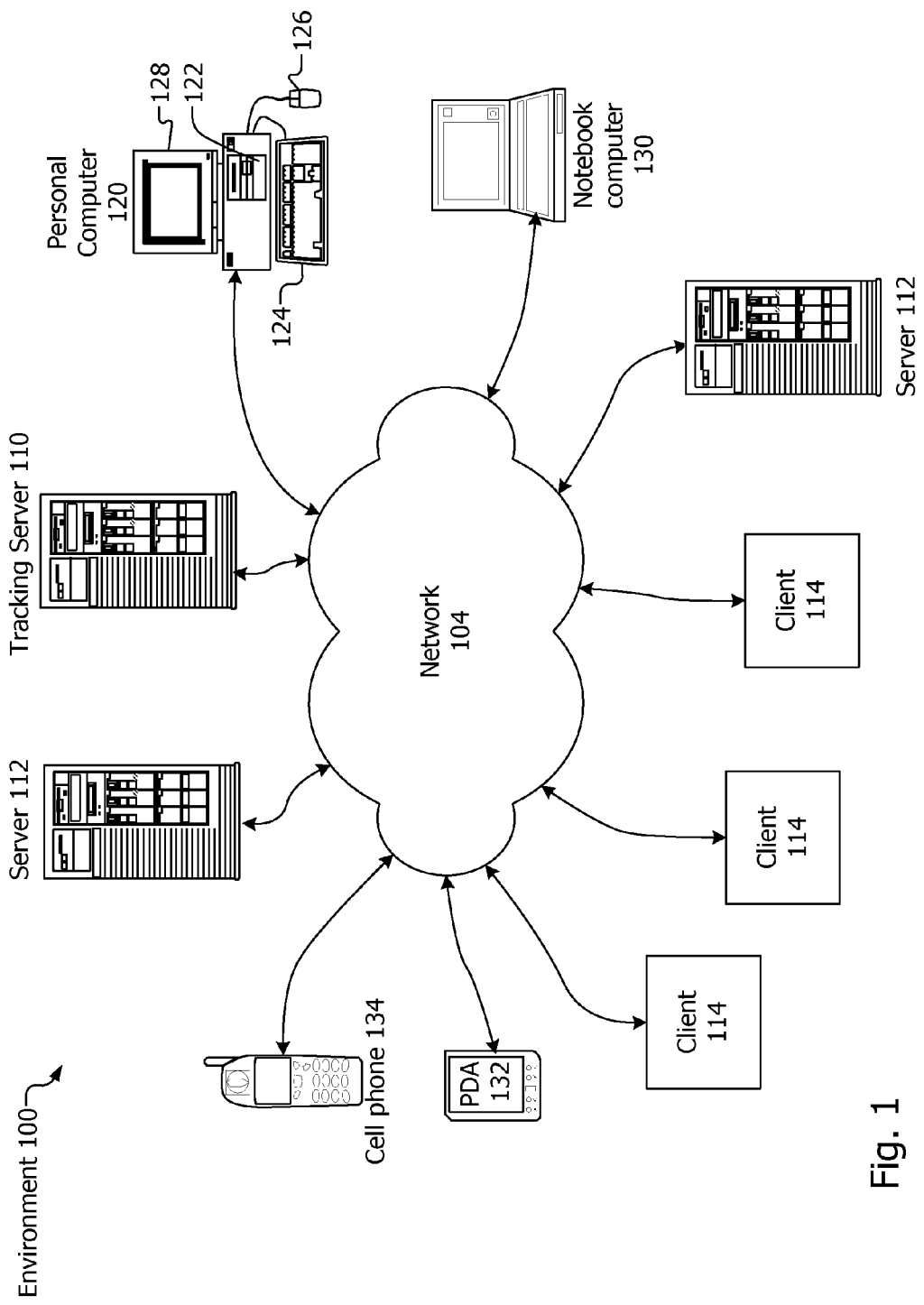
FIG. 1 is a block diagram of an environment in which the Internet site access monitoring techniques described herein may be implemented.

Referring now to FIG. 1, there is shown a block diagram of an environment 100 in which the Internet site access monitoring techniques described herein may be implemented. In the environment 100, multiple client devices 114 may be coupled with and communicate over network 104 with other client devices 114 and with one or more tracking servers 110 and other servers 112. Similarly, multiple tracking servers 110 and other servers 112 may be coupled with and communicate over network 104 with other tracking servers 110 and other servers 112 as well as with one or more client devices 114.

A server 110 may include software and/or hardware for providing the functionality and features described herein. A combination of one or more of each of servers 110, servers 112 and client devices 114 may include software for providing the functionality and features described herein. The tracking server 110, other servers 112 and the client devices 114, may be computing devices.

A computing device as used herein refers to a device with a processor, memory, network interface and a storage device. Computing devices are capable of executing instructions. The term computing device includes, but is not limited to, personal computers 120, server computers such as tracking server 110 and other server 112, computing tablets, set top boxes, video game systems, personal video recorders, telephones, cellular telephones 134, digital telephones, personal digital assistants (PDAs) 132, portable computers, notebook computers 130, and laptop computers. Computing devices may run an operating system, including, for example, variations of the Linux, Unix, MS-DOS, Microsoft Windows, Palm OS, Symbian OS, and Apple Mac OS X operating systems. Computing devices also include communications software that allows for communication over network 104. Depending on the computing device, the communications software may provide support for communications using one or more of the following communications protocols or standards: the User Datagram Protocol (UDP), the Transmission Control Protocol (TCP), the Internet Protocol (IP), and the Hypertext Transport Protocol (HTTP); one or more lower level communications standards or protocols such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI); and other protocols. Computing devices may include a network interface card, network chip, or network chip set that allows for communication over network 104.

The techniques described herein may be implemented in software stored on storage media accessible either directly or via a storage device included with or otherwise coupled or attached to a computing device. As such, storage media are readable by a computing device or other machine and may be referred to as machine readable media. These storage media include, for example, magnetic media such as hard disks, floppy disks and tape; optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include, hard disk drives, DVD drives, flash memory devices (such as readers and writers), and others.

The processes, methods, functionality and features of the Internet site access monitoring methods described herein may be embodied in whole or in part in software which operates on a tracking server 110, another server 112 and/or on a client device 114. The software may be in the form of, for example, one or more of an applet (e.g., a Java applet), a browser plug-in, an application program plug-in, a component object model (COM) object, a dynamic linked library (DLL), a script (e.g., Javascript, VBScript), an ActiveX control, a subroutine, an operating system component or service, firmware, an application program, and/or a combination thereof. The software may be implemented in one or more programming languages such as, for example, high level programming languages including C, C++, Java, Visual Basic, the hypertext markup language (HTML), Perl, Python, and others; or low level assembly and machine language.

Client devices 114 may include a display, user input devices, a storage media and storage device. For example, when the client device 114 is a personal computer 120, the personal computer 120 includes a display 128, a keyboard 124, a mouse 126 and a hard disk drive 122. Client devices 114 may have one or more user input devices, including, for example, keyboard 124, mouse 126, track ball, scroll wheel, touch pad, key pad, touch screen, navigation buttons, joystick, pen and tablet, stylus and touchscreen, and others. A user may use a user input device to click on, select, or otherwise activate or control a user interface item such as a button, link, slider, etc. and to provide input to the operating system or programs running on the client device via a graphical user interface, text interface or other user interface provided on the client device 114.

Tracking server 110 and other servers 112 are computing devices that are typically more robust than a client device, having greater processing capabilities, greater network throughput, and/or greater storage space when compared to a personal computer, cellular telephone or other client device. Although shown as a single server, each of tracking server 110 and other servers 112 may each be a server farm, group of servers (including application servers, database servers, content servers, and others), and may include a firewall, load balancer, and other network devices; and may include multiple devices in multiple locations.

To achieve the methods described herein, tracking server 110 may include typical server software such as, for example, an operating system and communications software as well as database software. The tracking server 110 may contain or have access to the database. The tracking server 110 may have one or more databases and other facilities to maintain information about Internet site access as described herein. The tracking server database may contain information about Internet user accesses to advertiser websites. The stored information may include one or more of a unique identifier related to a particular search query, the number of web pages traversed on the advertiser site, and/or the amount of time between each web page visit. The databases may be object oriented, relational, structured query language (SQL), and/or other. The tracking server 110 may access the database or provide access to the database via the Open DataBase Connectivity (ODBC) standard, via Java Database Connectivity (JDBC), mySQL or other standard and/or proprietary technique.

The network 104 may be a single network or a combination of multiple networks, including one or more of a local area network (LAN), a wide area network (WAN), a wireless wide-area networks (WWAN), a global system for mobile communications (GSM) network, an enhanced data for GSM evolution (EDGE), and a public switched telephone network (PSTN). In one embodiment, network 104 is the Internet. Network 104 may support various versions of the Ethernet protocol, the Internet protocol, and other data communications and/or voice communications protocols. The network 104 may be or include one or more of each of a packet switched network and/or a circuit switched network.

The tracking server 110, other servers 112 and client devices 114 may communicate over the network 104 via wired and/or wireless communications. The tracking server 110, other servers 112 and client devices 114 may communicate data units over the network 104. As used herein, a data unit refers to a frame, cell, datagram, packet or other unit of information.

Client devices may include an Internet browser such as Mozilla Firefox, Opera Software's Opera Web Browser, and Microsoft Internet Explorer. Internet browsers are capable of communicating and receiving data units the combine to made web pages. An Internet browser may be augmented with a Java virtual machine. An Internet browser may be augmented with a variety of plug-ins that provide additional functionality to the Internet browser. Internet browsers are capable of processing various communications protocols.

As will be described in more detail below, the tracking server 110 receives communications from client devices 112 such as a search query, for example, an Internet web search for a product. The tracking server 110 may prepare a search response that includes information that allows the tracking server to monitor the user's access to advertiser's websites included as advertiser links in the search response.

Methods

Figure 2:
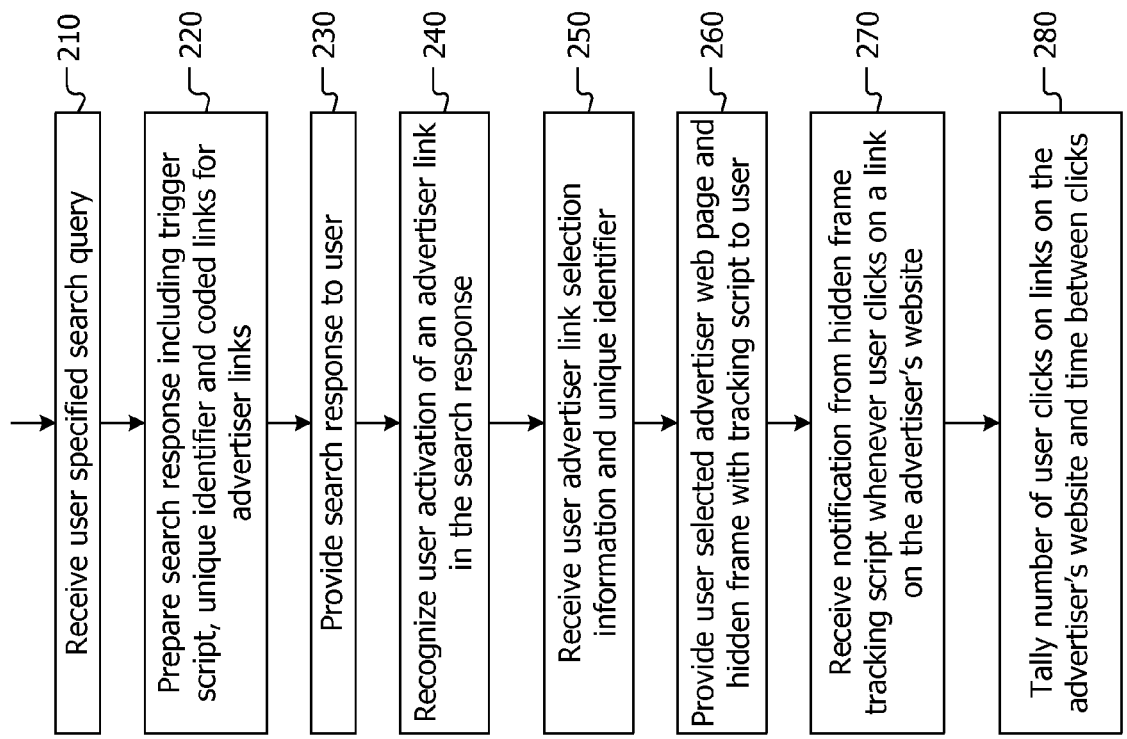
FIG. 2 is a flow chart of the actions taken according to an embodiment of the Internet site access monitoring techniques browser window.
Figure 3:
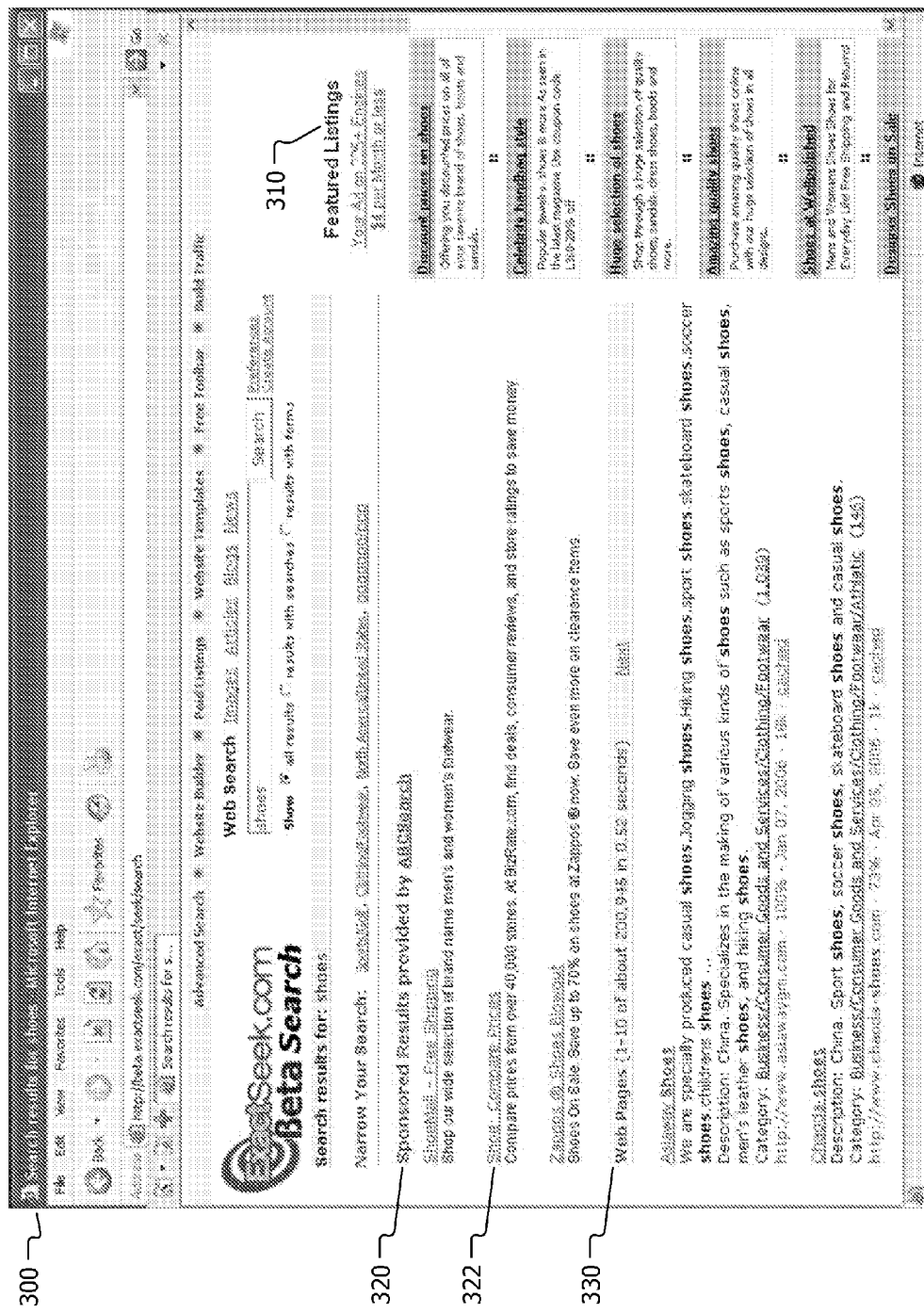
FIG. 3. is a screen shot of an example search engine provider search response web page shown in an Internet browser window.

FIG. 2 is a flow chart of the actions taken according to an embodiment of the Internet site access monitoring techniques described herein. As a preliminary action, a user may direct a web browser to a search engine provider website and enter a search query. The search engine provider website may be provided by a tracking server 110 or another server 112 shown in FIG. 1 and described above. FIG. 3. is a screen shot of an example search engine provider search response web page 300 shown in an Internet browser window. Web page 300 shows the results of the preliminary action and the following actions. A server may receive the user specified search query, as shown in block 210. The server may be a tracking server 110 or may be another server 112 that may be in communication with a tracking server 110.

The server may process the search request and may prepare a search response, including a trigger script, a unique identifier and coded links for advertiser links included in the search response, as shown in block 220. A trigger script may be a Javascript, an applet, a URI (Uniform Resource Identifier), a URL (Uniform Resource Locator), a CGI (Common Gateway Interface) script or other single command or instruction, or multiple part command or group of instructions. Each coded link may include a unique identifier (ID) of the current search query. The unique ID may include one or more of a host name, a random number, a process identifier, and a time stamp. In one embodiment, the host name is the name of search engine provider company and may be the portion of a domain name appearing adjacent to the three letter domain name type. For example, if the search engine provider website is greatsearch-.com, then the host name is "greatsearch." The random number may be 6, 8, 10, 12, 16, 24, etc. digits. The time stamp may be a numeric string representing the time the search query was made or received. The process ID refers to a numeric or other designation of a computer process that received and processed the search query. An example coded link is:

http://1.2.33.44/redirect/
?affiliate=AA&subid=BB&Terms=ipod&alid=CC&v3=DD

Referring to this example coded link, the coded link may specify a redirection and pertinent data such as an affiliate identifier (affiliate=AA), a sub-ID (subid=BB), search terms (for example, Terms=ipod or Terms=shoes), an ancillary ID (alid=CC), and the unique ID (v3=DD). Again, this is merely an example coded link. A coded link may have more and fewer fields than shown in this example.

The server may provide the search response to the user, as shown in block 230.

An example search engine provider search response web page 300 is shown in FIG. 3. In this example the search was for the term "shoes." The search response may include featured sponsored links 310, sponsored search result listings 320 and search results listings 330 (shown as "web pages"). Each of the featured sponsored links 310 and sponsored search result listings 320 may include a coded link. In addition, or in the alternative, those search results 330 that received premium placement may also include a coded link. As such, one or more of each of the featured sponsored links 310, sponsored search result listings 320 and search results listings 330 may be considered advertiser links.

The user may click on, select or otherwise activate an advertiser link, such as, for example, advertiser link 322 shown in FIG. 3, or other coded link included in the search response. The user may also click on a link which is not an advertiser link. The user may redirect the browser to another website independent of the search response. User activation of the advertiser link may be achieved by a user input device, such as, for example, by clicking on or otherwise using a user input device. User activation may also be achieved by voice commands using a voice recognition system included in a user computing device. The user activation may be sent as a communication prepared by the trigger script included in the search response, and/or the coded link included as part of the advertiser link in the search response, or otherwise included in the search response.

Returning to a discussion of FIG. 2, the server may recognize user activation of an advertiser link in the search response, as shown in block 240. The server may receive information about the advertiser link activated by the user and the unique identifier, as shown in block 250.

In response to recognizing the user activation of the advertiser link, a server may provide the user the user selected advertiser web page in a first frame and a hidden frame that includes a tracking script, as shown in block 260. The first frame and a hidden frame may be provided in a window of the user's web browser. The first frame and the hidden frame may be provided using HTML frames and may be implemented using the <frameset> </frameset> tags. The first frame may be the entire size of the available window in the Internet browser, and the hidden frame may have a height and width of zero. The providing of the first frame and hidden frame may be achieved by the server and initiated by the trigger script. When the user clicks on or otherwise activates a link in the advertiser web page, the tracking script in the hidden frame may send information to the server.

In one embodiment, the tracking script in the hidden frame is a Javascript script that waits for the occurrence of an "onload" even to occur in the first frame. In web browsers, an "onload" event occurs whenever a user clicks on a link and a new web page is loaded into a frame. The server may receive notification from the tracking script in the hidden frame whenever the user clicks on, selects or otherwise activates a link on the advertiser's website, as shown in block 270. In one embodiment, the server receives notification from the tracking script in the hidden frame whenever an "onload" event occurs in the first frame.

The tracking script may also include a timer or a "get time" subscript or instruction. When a timer is used, the timer may be started on initial display of the first frame. The tracking script may capture the value of the timer when "onload" events occur. The tracking script may restart the timer after a user clicks on a link in the advertiser web page. The notification sent by the tracking script may include the value of the timer when the "onload" event occurred. In this way, the tracking script may send as part of the notification the amount of time the user spent "on" or viewing a web page. When a "get time" subscript or instruction is included in the tracking script, the tracking script may get the current time when an "onload" event occurs and send the current time. The server may then calculate the difference in time between web page visits to evaluate the duration or length of a user's visit to a particular web page.

The tracking script may also include a counter. The counter may be used to increment the depth of a user's access to a website. That is, as a user drills down into a website by accessing various web pages, the counter may be incremented. In this way, the counter may keep track of the user's page depth. For example, if a user visits a department store website, selects shoes, selects the women's shoe department, and then selects sandals, the depth of the user's visit is four. In another embodiment, the counter may be replaced by a simple numeric variable that is incremented by the tracking script when a user accesses various levels or depths of a website.

In another embodiment, the tracking script provides a web page identifier (in the form of a URI or URL) and a time of the user's visit. In this embodiment, a server that receives information from the tracking script may evaluate the depth of a user's visit to a website by analyzing the web pages traversed by a user. The server may calculate the difference between time ordered user website visits to evaluate a depth and a duration of visit to web pages on a website. The server may prepare a user quality measure, ranking or classification of the user visits based on the duration of the user's visit and the depth of the user's visit.

Figure 4:
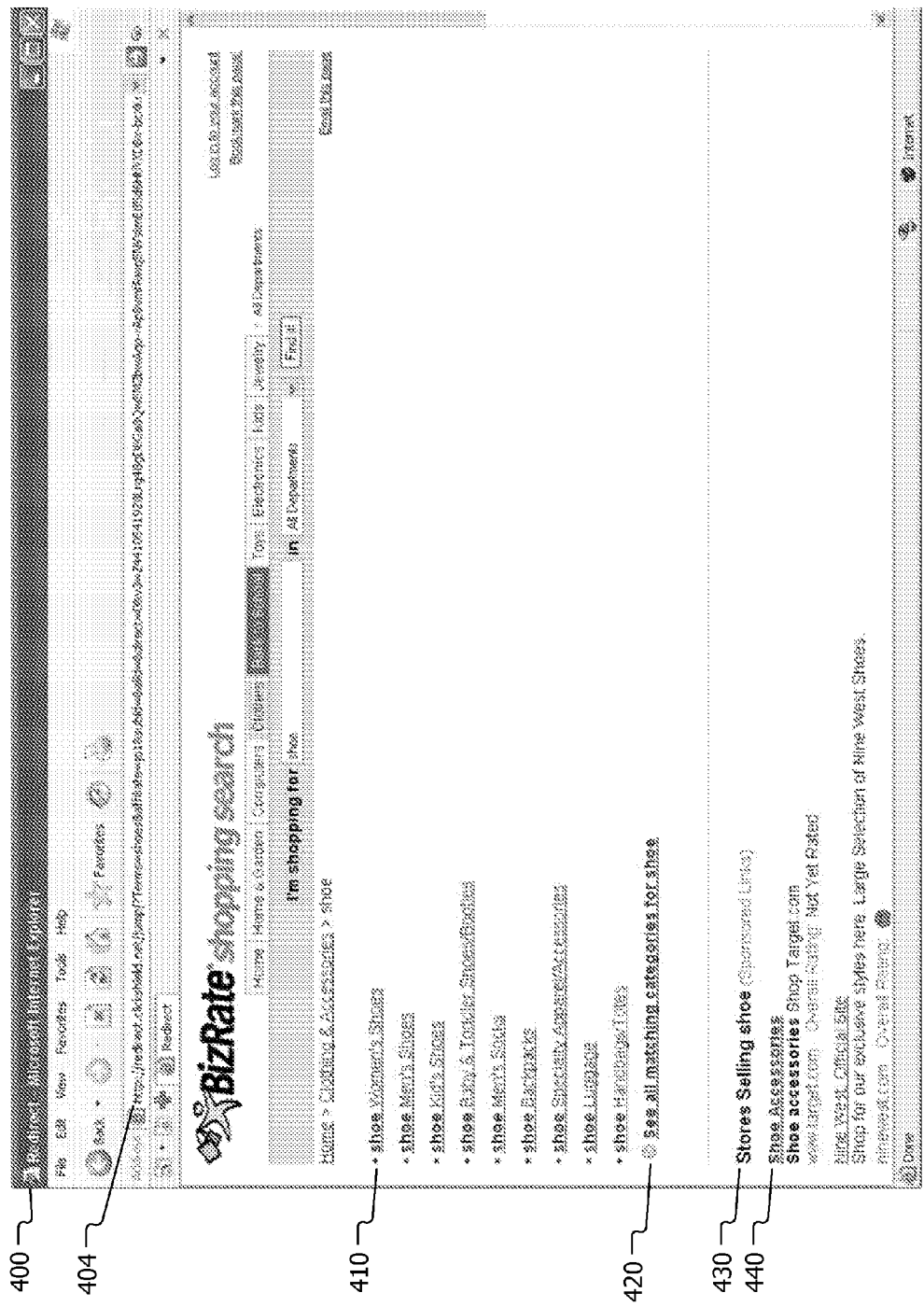
FIG. 4. is a screen shot of an example advertiser web page shown in an Internet browser window.

FIG. 4. is a screen shot of an example advertiser web page 400 shown in an Internet browser window. When the user clicks on product 420 or seeks further information by clicking on a link such as links 410, 420, 430 and 440, the tracking script in the hidden frame sends tracking information to the server. The information the server receives from the tracking script may include the unique ID of the user associated with the initial search query, the time of the click (a time stamp) or other activation and/or the time from last click to this click, an advertiser ID, and other information. The tracking script may also include a page depth value and/or a web page identifier.

Returning to a discussion of FIG. 2, the server may keep a tally of the number of user clicks on links on the advertiser's website as well as the time between each of the clicks, as shown in block 280.

The server may also keep track of each click made through each search response. That is, the server may store information that may be used to associate the unique ID created based on the initial search query with user activity data. The user activity data may include a tally of the number of clicks made through a search response, as well as the number of clicks made when visiting an advertiser website and the time between clicks made when visiting an advertiser's website. The user activity data may include timestamps or other time information received from the tracking script. The user activity data may include URIs and URLs of visited web pages received from the tracking script.

The server may use the user activity data to evaluate or calculate the page depth of a user's visit to a website by evaluating the web pages viewed and the sequence, based on the time of web page visits. The server may tally the page depth of a user's visits to various web sites based on page depth information received from the tracking script. The page depth tally may be used to provide a ranking or quality measure of user traffic to a particular website. The server may use the user activity data to create aggregate statistics about the quality of the Internet traffic directed to advertiser websites.

One use of the Internet user access monitoring described herein is the ability to identify click fraud and verify the veracity of web site visit statistics. For example, if there is in inordinate amount of short (for example, one to ten second) visits to a web page or website, it may be concluded that click fraud has occurred. That is, a company may have hired a company to pay people to visit their website. This additional user traffic may be monitored and used by third parties to increase the page ranking of a website which may be used by third parties in ordering Internet search results. The methods described herein may used to help identify click fraud by providing the time between user clicks when visiting web pages on a website and/or by providing information about consecutive visits to the same website.

Another feature of the Internet user access monitoring described herein is the server's ability to rank a unique user's access to an advertiser website. For example, a metric may be created wherein the number of clicks and the time between clicks is used to rank the quality of a user's visit on a scale such as 1-10 or A, B, C. An advertiser may be charged an advertiser fee based on the quality of the user's visits. For example, if a user merely traverses the website, clicks on two links, and spends a total of 23 seconds on the website, the quality of the user's visit may be deemed a C or 2. Whereas, if a user traverses the website, clicks on five links, and spends a total of 86 seconds on the website, the quality of the user's visit may be deemed a B or 6. In these examples, an advertise may be charged a lower fee for the first visit and a higher fee for the second visit, namely, $0.20 for the C visit and $0.45 for the B visit.

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, "plurality" means two or more.

As used herein, whether in the written description or the claims, the terms "comprising", "including", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

A used herein, "and/or" means that the listed items are alternatives, but the alternatives also include any combination of the listed items.

It is claimed:

1. A method for website access monitoring performed by a server that provides advertiser web pages to a user computing device over a network, the method comprising:

the server receiving over the network from a user computing device a user specified search query;

the server preparing a search response including a trigger script and at least one advertiser link, the advertiser link including a coded link to one of the advertiser web pages the server providing the search response to the user computing device;

the server recognizing user activation of a first advertiser link by the user at the user computing device;

the server receiving advertiser link selection information and a unique identifier sent by the trigger script from the user computing device;

the server providing to the user computing device a first advertiser web page from an advertiser website and a hidden frame including a tracking script, the first advertiser web page corresponding to the first advertiser link;

the server receiving a notification over the network from the tracking script on the user computing device when the user clicks on a link on the advertiser web page, wherein the notification includes a time, a web page identifier and the unique identifier;

the server evaluating a page depth based on the web page identifiers included in a plurality of notifications received from the user computing device over the network, the evaluating including calculating the difference between time ordered user visits to advertiser web pages and a tally of the number of clicks made through the search response;

the server tracking user access to the advertiser website based on at least the time and the unique identifier included in the plurality of notifications;

the server identifying click fraud indicated by the page depth and a time between clicks;

the server preparing a quality ranking of a plurality of advertiser website visits based on a computation of the time between clicks derived from the plurality of notifications.

2. The method of claim 1, wherein the server receiving a notification occurs when an onload event occurs in the hidden frame.

3. The method of claim 1, wherein preparing a quality ranking is further based on the page depth.

4. A server having instructions stored on a storage medium which when executed cause the server to perform actions to monitor user access of advertiser websites, the actions comprising:

receiving over a network from a user computing device a user specified search query;

preparing a search response including a trigger script and at least one advertiser link, the advertiser link including a coded link;

providing the search response to the user computing device over the network;

recognizing user activation of a first advertiser link at the user computing device;

receiving over the network advertiser link selection information and a unique identifier sent by the trigger script at the user computing device;

providing to the user computing device an advertiser web page of an advertiser website and a hidden frame including a tracking script;

receiving over the network a notification from the tracking script at the user computing device when the user clicks on a link on the advertiser web page, wherein the notification includes a time, a web page identifier and the unique identifier;

evaluating a page depth based on the web page identifiers included in a plurality of notifications received from the user computing device over the network, the evaluating including calculating the difference between time ordered user visits to advertiser web pages and a tally of the number of clicks made through the search response;

tracking user access to the advertiser website based on at least the time and the unique identifier included in the plurality of notifications;

identifying click fraud indicated by the page depth and a time between clicks;

preparing a quality ranking of a plurality of advertiser website visits based on a computation of the time between clicks derived from the plurality of notifications.

5. The server of claim 4, wherein receiving over the network a notification from the tracking script occurs when an onload event occurs in the hidden frame.

6. The server of claim 4, wherein preparing a quality ranking is further based on the page depth.

7. A machine readable medium having instructions stored thereon which when executed cause a server to perform actions to monitor website access, the actions comprising:

receiving from a user computing device over a network a user specified search query;

preparing a search response including a trigger script and at least one advertiser link, the advertiser link including a coded link;

providing the search response to the user computing device over the network;

recognizing user activation of a first advertiser link;

receiving from the user computing device over the network advertiser link selection information and a unique identifier sent by the trigger script in response to the recognizing;

providing to the user computing device over the network an advertiser web page of an advertiser website and a hidden frame including a tracking script;

receiving a notification from the tracking script when the user clicks on a link on the advertiser web page, wherein the notification includes a time, a web page identifier and the unique identifier;

evaluating a page depth based on the web page identifiers included in a plurality of notifications, the evaluating including calculating the difference between time ordered user visits to advertiser web pages and a tally of the number of clicks made through the search response;

tracking user access to the advertiser website based on at least the time and the unique identifier included in the plurality of notifications received over the network from the user computing device;

identifying click fraud indicated by the page depth and a time between clicks;

preparing a quality ranking of a plurality of advertiser website visits based on a computation of the time between clicks derived from the plurality of notifications.

8. The machine readable medium of claim 7, wherein receiving a notification from the tracking script occurs when an onload event occurs in the hidden frame.

9. The machine readable medium of claim 7, wherein preparing a quality ranking is further based on the page depth.

* * * * *